US012643788B2

(12) United States Patent
Alfonso Vargas et al.

(10) Patent No.: US 12,643,788 B2
(45) Date of Patent: Jun. 2, 2026

(54) REACTOR FOR ON-DEMAND HIGH PRESSURE HYDROGEN

(71) Applicants: UNIVERSITY OF SOUTHERN CALIFORNIA, Los Angeles, CA (US); TRIAD NATIONAL SECURITY, LLC, Los Alamos, NM (US)

(72) Inventors: Nicolas Alfonso Vargas, Los Angeles, CA (US); Travis J. Williams, Los Angeles, CA (US); Robert P. Currier, Santa Fe, NM (US); Anthony Jose AJ Chavez, Downey, CA (US); Van K. Do, Los Angeles, CA (US); John Cameron Gordon, Calverton, NY (US)

(73) Assignees: University of Southern California, Los Angeles, CA (US); Triad National Security, LLC, Los Alamos, NJ (US)

( * ) Notice: Subject to any disclaimer, the term of this patent is extended or adjusted under 35 U.S.C. 154(b) by 968 days.

(21) Appl. No.: 17/717,786

(22) Filed: Apr. 11, 2022

(65) Prior Publication Data

US 2022/0332574 A1 Oct. 20, 2022

Related U.S. Application Data

(60) Provisional application No. 63/173,459, filed on Apr. 11, 2021.

(51) Int. Cl.
*C01B 3/326* (2026.01)
*B01J 8/02* (2006.01)

(52) U.S. Cl.
CPC ............ *C01B 3/326* (2013.01); *B01J 8/0278* (2013.01); *B01J 8/0285* (2013.01); (Continued)

(58) Field of Classification Search
CPC ..... B01J 7/00; B01J 8/00; B01J 8/0005; B01J 8/02; B01J 8/0278; B01J 8/0285; (Continued)

(56) References Cited

U.S. PATENT DOCUMENTS 7,795,175 B2 9/2010 Olah et al.
8,754,000 B2 * 6/2014 Chan .................... B01J 37/0205 502/185

(Continued)

OTHER PUBLICATIONS

Internet Search (Year: 2025).*

(Continued)

*Primary Examiner* — Natasha E Young
(74) *Attorney, Agent, or Firm* — Brooks Kushman P.C.

(57) ABSTRACT

A flow reactor system for providing on-demand $H_2$ evolution at pressure from a liquid organic hydrogen carrier and/or blends thereof includes a reactor that includes a reaction vessel having an inlet and outlet. The inlet is configured to introduce reactants into the reaction vessel, and the outlet is configured to release reaction products. The reaction vessel is configured to hold therein a catalyst system capable of catalyzing the evolution of molecular hydrogen from a liquid organic hydrogen carrier. Advantageously, the reaction vessel is configured to operate at pressures greater than or equal to 50 psig (e.g., from about 50 psig to about 10500 psig. The flow reactor system also includes a source of preheated liquid organic hydrogen carrier in fluid communication with the reactor and a purification system in fluid communication with the outlet that provides purified molecular hydrogen gas for on-demand applications.

28 Claims, 3 Drawing Sheets

(52) U.S. Cl.
CPC ................. *B01J 2208/00061* (2013.01); *B01J 2208/0007* (2013.01); *B01J 2208/00247* (2013.01); *C01B 2203/02* (2013.01); *C01B 2203/04* (2013.01); *C01B 2203/1041* (2013.01); *C01B 2203/1623* (2013.01)

(58) Field of Classification Search
CPC ........ B01J 19/00; B01J 19/24; B01J 2208/00; B01J 2208/00008; B01J 2208/00017; B01J 2208/00026; B01J 2208/00035; B01J 2208/00044; B01J 2208/00061; B01J 2208/0007; B01J 2208/00106; B01J 2208/00168; B01J 2208/00247; B01J 2219/00; B01J 2219/00002; B01J 2219/00027; B01J 2219/00033; C01B 3/00; C01B 3/20; C01B 3/22; C01B 3/32–326; C01B 3/50; C01B 3/52; C01B 2203/02; C01B 2203/0266; C01B 2203/0277; C01B 2203/04; C01B 2203/0415; C01B 2203/0465; C01B 2203/0475; C01B 2203/10; C01B 2203/1041; C01B 2203/12–1211; C01B 2203/16; C01B 2203/1614; C01B 2203/1623; C01B 2203/1628; C01B 2203/1642; C01B 2203/1647
See application file for complete search history.

(56) References Cited

U.S. PATENT DOCUMENTS

| | | | |
|---|---|---|---|
| 9,968,880 | B2 | 5/2018 | Goeppert et al. |
| 10,179,798 | B2 | 1/2019 | Williams et al. |
| 10,556,921 | B2 | 2/2020 | Williams et al. |
| 10,751,689 | B2 | 8/2020 | Goeppert et al. |

OTHER PUBLICATIONS

Wang et al., Recent progress in hydrogen production from Formic acid decomposition, International Journal of Hydrogen Energy, 43, 2018, 7055-7071 (Year: 2018).*

* cited by examiner

REACTOR FOR ON-DEMAND HIGH PRESSURE HYDROGEN

CROSS-REFERENCE TO RELATED APPLICATIONS

This application claims the benefit of U.S. provisional application Ser. No. 63/173,459 filed Apr. 11, 2021, the disclosure of which is hereby incorporated in its entirety by reference herein.

STATEMENT REGARDING FEDERALLY SPONSORED RESEARCH OR DEVELOPMENT

The invention was made with Government support under Contract No. DE-EE0008825 awarded by the U.S. Department of Energy (DOE). The Government has certain rights to the invention.

TECHNICAL FIELD

In at least one aspect, a system for catalytically producing on-demand hydrogen at pressure is provided.

BACKGROUND

On-demand hydrogen generation provides a "green" alternative to fossil fuel. In one application, hydrogen gas is needed on large scale for hydrotreating fuel feedstocks and bulk chemicals. In another, it can be used to power fuel cells. The electricity generated from fuel cells can be used to power aircraft, motor vehicles, and other electronic devices. Currently, hydrogen gas is generated by the electrolysis of water and by steam-methane reforming. Although these technologies work well, commercial scaleup and economics are an ongoing challenge.

Accordingly, there is a need for improved technologies for producing on-demand hydrogen, particularly from hydrogen-rich liquid carriers.

SUMMARY

In at least one aspect, a flow reactor system for producing pure $H_2$ gas is provided. The flow reactor system can provide 6.5 kg/hr or more of high-pressure, pure $H_2$ gas. The design involves pumping high-pressure liquid organic hydrogen carrier (e.g., formic acid) into a continuous stirred-tank reactor, using a homogeneous/heterogeneous catalyst blend to dehydrogenate the feed completely to $H_2$ and $CO_2$ selectively. Downstream of the reactor, a reflux condenser forces the liquid organic hydrogen carrier and water impurities to stay within the reactor, allowing only $H_2$ and $CO_2$ to pass. The hydrogen gas is purified in three stages, first by $CO_2$ condensation, second by $CO_2$ extraction by cold, high-pressure water, and optionally third by a $CO_2$ sorbent that purifies the stream to less than 5 ppm $CO_2$, less than 10 ppm moisture, and less than 5 ppm CO.

In another aspect, a flow reactor system for on-demand $H_2$ evolution from liquid organic hydrogen carriers and/or blends thereof is provided. The flow reactor system includes a reactor that includes a reaction vessel having an inlet and outlet. The inlet is configured to introduce reactants into the reaction vessel, and the outlet is configured to release reaction products. The reaction vessel is configured to hold therein a catalyst system capable of catalyzing the evolution of molecular hydrogen from the liquid organic hydrogen carrier. Advantageously, the reaction vessel is configured to operate at pressures greater than or equal to 50 psig (e.g., from about 50 psig to about 10500 psig). The flow reactor system also includes a source of preheated liquid organic hydrogen carrier in fluid communication with the reactor and a purification system in fluid communication with the outlet that provides purified molecular hydrogen gas for on-demand applications either on site to involving tank or trailer filling.

In another aspect, a flow reactor system for providing on-demand $H_2$ evolution from liquid organic hydrogen carriers and/or blends thereof is provided. The flow reactor system includes a reactor that has a reaction vessel having an inlet and outlet. The inlet is configured to introduce reactants into the reaction vessel and the outlet is configured to release reaction products as a gaseous reaction product stream. The reaction vessel is configured to hold therein a catalyst system capable of catalyzing the evolution of molecular hydrogen from liquid organic hydrogen carriers and/or blends thereof. The reaction vessel is configured to operate at pressures greater than or equal to 50 psig (e.g., from about 50 psig to about 10500 psig). The flow reactor system also includes a source of preheated fuel in fluid communication with the reactor and a purification system in fluid communication with the outlet. Advantageously, the purification system provides purified molecular hydrogen gas.

In another aspect, a flow reactor system for providing on-demand $H_2$ evolution from formic acid and/or blends thereof is provided. The flow reactor system includes a reactor that has a reaction vessel having an inlet and outlet. The inlet is configured to introduce reactants into the reaction vessel and the outlet is configured to release reaction products as a gaseous reaction product stream. The reaction vessel is configured to hold therein a catalyst system capable of catalyzing the evolution of molecular hydrogen from formic acid and/or blends. The reaction vessel is configured to operate at pressures greater than or equal to 50 psig (e.g., from about 50 psig to about 10500 psig). The flow reactor system also includes a source of preheated fuel in fluid communication with the reactor and a purification system in fluid communication with the outlet. Advantageously, the purification system provides purified molecular hydrogen gas.

In still another aspect, a method for producing on-demand $H_2$ from organic hydrogen carriers and/or blends thereof in the flow reactor system described herein is provided. The method includes steps of providing a reaction vessel having a catalyst system disposed therein and continuously flowing a preheated liquid organic hydrogen carrier or a blend thereof into the reaction vessel over a predetermined period of time at pressures greater than or equal to 50 psig (e.g., from about 50 psig to about 10500 psig). An output stream from the reaction vessel is (continuously) purified to obtain purified molecular hydrogen gas.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWING

For a further understanding of the nature, objects, and advantages of the present disclosure, reference should be had to the following detailed description, read in conjunction with the following drawings, wherein like reference numerals denote like elements and wherein.

DETAILED DESCRIPTION

Figure 1A:
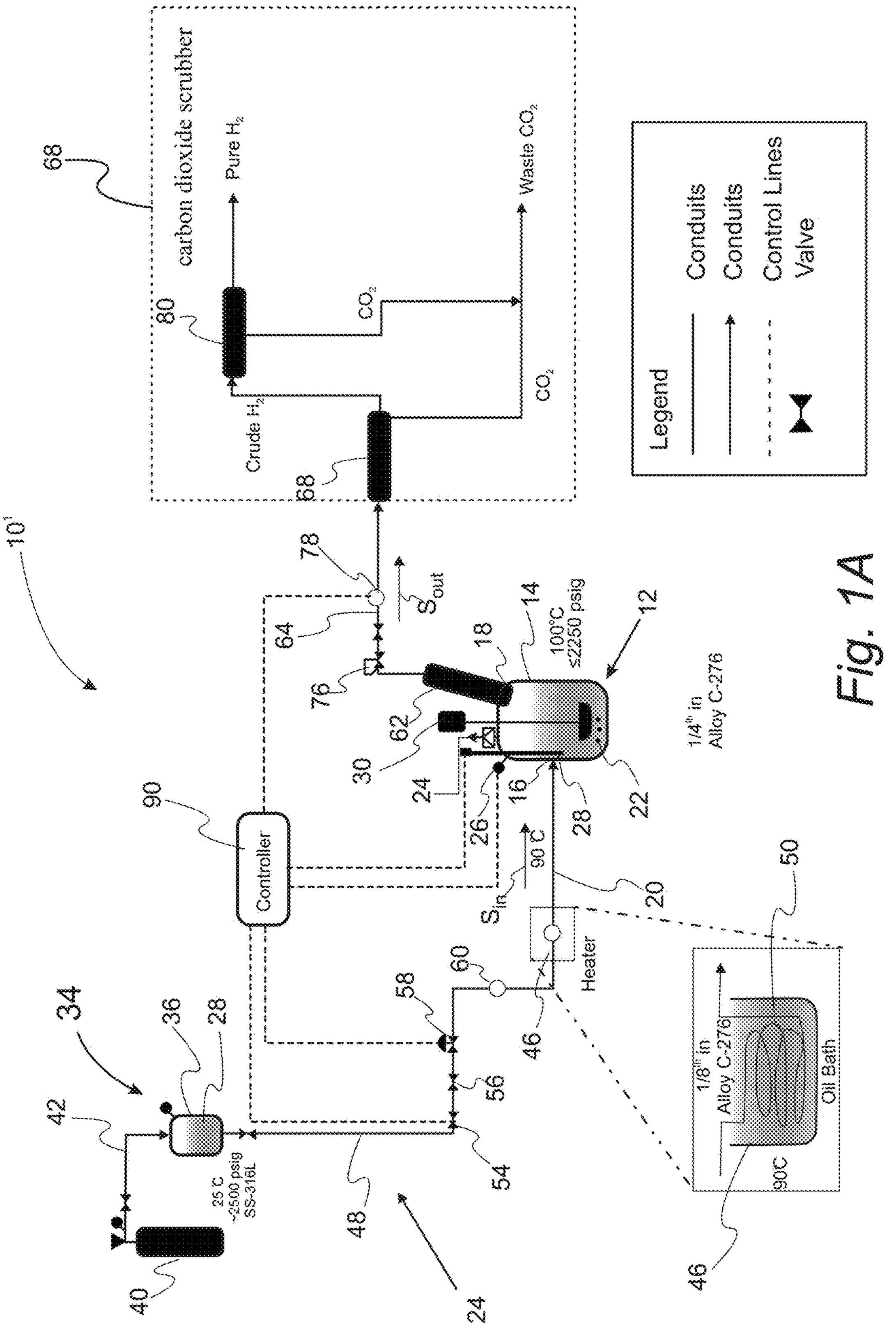
FIG. 1A. Schematic of a flow reactor system for producing on-demand molecular hydrogen gas.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: all R groups (e.g. $R_i$ where i is an integer) include hydrogen, alkyl, lower alkyl, $C_{1-6}$ alkyl, $C_{6-10}$ aryl, $C_{6-10}$ heteroaryl, alylaryl (e.g., $C_{1-8}$ alkyl $C_{6-10}$ aryl), —$NO_2$, —$NH_2$, —N(R'R"), —$N(R'R''R''')^+L^-$, Cl, F, Br, —$CF_3$, —$CCl_3$, —CN, —$SO_3H$, —$PO_3H_2$, —COOH, —$CO_2R'$, —COR', —CHO, —OH, —OR', —$O^-M^+$, —$SO_3^-M^+$, —$PO_3^-M^+$, —$COO^-M^+$, —$CF_2H$, —$CF_2R'$, —$CFH_2$, and —CFR'R" where R', R" and R''' are $C_{1-10}$ alkyl or $C_{6-18}$ aryl groups, $M^+$ is a metal ion, and $L^-$ is a negatively charged counter ion; R groups on adjacent carbon atoms can be combined as —$OCH_2O$—; single letters (e.g., "n" or "o") are 1, 2, 3, 4, or 5; in the compounds disclosed herein a CH bond can be substituted with alkyl, lower alkyl, $C_{1-6}$ alkyl, $C_{6-10}$ aryl, $C_{6-10}$ heteroaryl, —$NO_2$, —$NH_2$, —N(R'R"), —$N(R'R''R''')^+L^-$, Cl, F, Br, —$CF_3$, —$CCl_3$, —CN, —$SO_3H$, —$PO_3H_2$, —COOH, —$CO_2R'$, —COR', —CHO, —OH, —OR', —$O^-M^+$, —$SO_3^-M^+$, —$PO_3^-M^+$, —$COO^-M$, —$CF_2H$, —$CF_2R'$, —$CFH_2$, and —CFR'R" where R', R" and R''' are $C_{1-10}$ alkyl or $C_{6-18}$ aryl groups, $M^+$ is a metal ion, and $L^-$ is a negatively charged counter ion; hydrogen atoms on adjacent carbon atoms can be substituted as —$OCH_2O$—; when a given chemical structure includes a substituent on a chemical moiety (e.g., on an aryl, alkyl, etc.) that substituent is imputed to a more general chemical structure encompassing the given structure; percent, "parts of," and ratio values are by weight; the term "polymer" includes "oligomer," "copolymer," "terpolymer," and the like; molecular weights provided for any polymers refers to weight average molecular weight unless otherwise indicated; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It must also be noted that, as used in the specification and the appended claims, the singular form "a," "an," and "the" comprise plural referents unless the context clearly indicates otherwise. For example, reference to a component in the singular is intended to comprise a plurality of components.

As used herein, the term "about" means that the amount or value in question may be the specific value designated or some other value in its neighborhood. Generally, the term "about" denoting a certain value is intended to denote a range within +/−5% of the value. As one example, the phrase "about 100" denotes a range of 100+/−5, i.e. the range from 95 to 105. Generally, when the term "about" is used, it can be expected that similar results or effects according to the invention can be obtained within a range of +/−5% of the indicated value.

As used herein, the term "and/or" means that either all or only one of the elements of said group may be present. For example, "A and/or B" shall mean "only A, or only B, or both A and B". In the case of "only A", the term also covers the possibility that is absent i.e. "only A, but not B".

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The phrase "composed of" means "including" or "consisting of." Typically, this phrase is used to denote that an object is formed from a material.

With respect to the terms "comprising," "consisting of," and "consisting essentially of," where one of these three terms is used herein, the presently disclosed and claimed subject matter can include the use of either of the other two terms.

The term "one or more" means "at least one" and the term "at least one" means "one or more." The terms "one or more" and "at least one" include "plurality" and "multiple" as a subset. In a refinement, "one or more" includes "two or more."

The term "substantially," "generally," or "about" may be used herein to describe disclosed or claimed embodiments. The term "substantially" may modify a value or relative characteristic disclosed or claimed in the present disclosure.

In such instances, "substantially" may signify that the value or relative characteristic it modifies is within ±0%, 0.1%, 0.5%, 1%, 2%, 3%, 4%, 5% or 10% of the value or relative characteristic.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

When referring to a numeral quantity, in a refinement, the term "less than" includes a lower non-included limit that is 5 percent of the number indicated after "less than." For example, "less than 20" includes a lower non-included limit of 1 in a refinement. Therefore, this refinement of "less than 20" includes a range between 1 and 20. In another refinement, the term "less than" includes a lower non-included limit that is, in increasing order of preference, 20 percent, 10 percent, 5 percent, or 1 percent of the number indicated after "less than."

In the examples set forth herein, concentrations, temperature, and reaction conditions (e.g., pressure, pH, flow rates, etc.) can be practiced with plus or minus 50 percent of the values indicated rounded to or truncated to two significant figures of the value provided in the examples. In a refinement, concentrations, temperature, and reaction conditions (e.g., pressure, pH, flow rates, etc.) can be practiced with plus or minus 30 percent of the values indicated rounded to or truncated to two significant figures of the value provided in the examples. In another refinement, concentrations, temperature, and reaction conditions (e.g., pressure, pH, flow rates, etc.) can be practiced with plus or minus 10 percent of the values indicated rounded to or truncated to two significant figures of the value provided in the examples.

For all compounds expressed as an empirical chemical formula with a plurality of letters and numeric subscripts (e.g., $CH_2O$), values of the subscripts can be plus or minus 50 percent of the values indicated rounded to or truncated to two significant figures. For example, if $CH_2O$ is indicated, a compound of formula $C_{(0.8-1.2)}H_{(1.6-2.4)}O_{(0.8-1.2)}$. In a refinement, values of the subscripts can be plus or minus 30 percent of the values indicated rounded to or truncated to two significant figures. In still another refinement, values of the subscripts can be plus or minus 20 percent of the values indicated rounded to or truncated to two significant figures.

The term "transition metal" means an element whose atom has a partially filled d sub-shell, or which can give rise to cations with an incomplete d sub-shell. Examples of transition metals includes scandium, titanium, vanadium, chromium, manganese, iron, cobalt, nickel, copper, yttrium, zirconium, niobium, molybdenum, technetium, ruthenium, rhodium, palladium, silver, hafnium, tantalum, tungsten, rhenium, osmium, iridium, platinum, and gold.

Throughout this application, where publications are referenced, the disclosures of these publications in their entireties are hereby incorporated by reference into this application to more fully describe the state of the art to which this invention pertains.

Abbreviations

"$H_2$" means molecular hydrogen.

"MES" means mesityl.

"psig" means pounds per square inch above the ambient pressure of the gauge.

"OTf" is trifluoromethanesulfonate.

"py" is pyrindine.

"cym" is cymene.

Figure 1B:
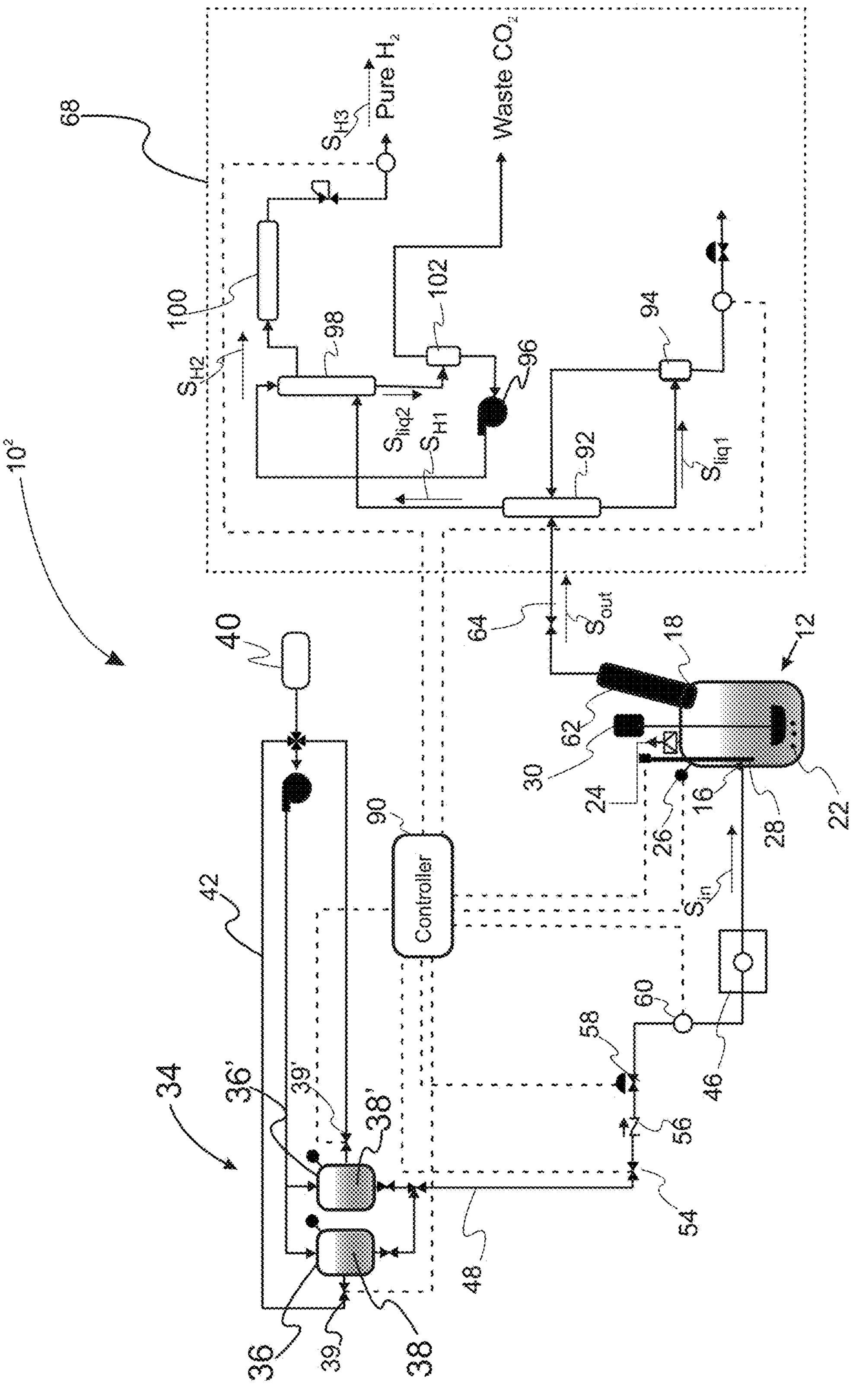
FIG. 1B. Schematic of a flow reactor system for producing on-demand molecular hydrogen gas that includes an apparatus and method for separation of $CO_2$ and $H_2$ on the back end of the reactor.
Figure 1C:
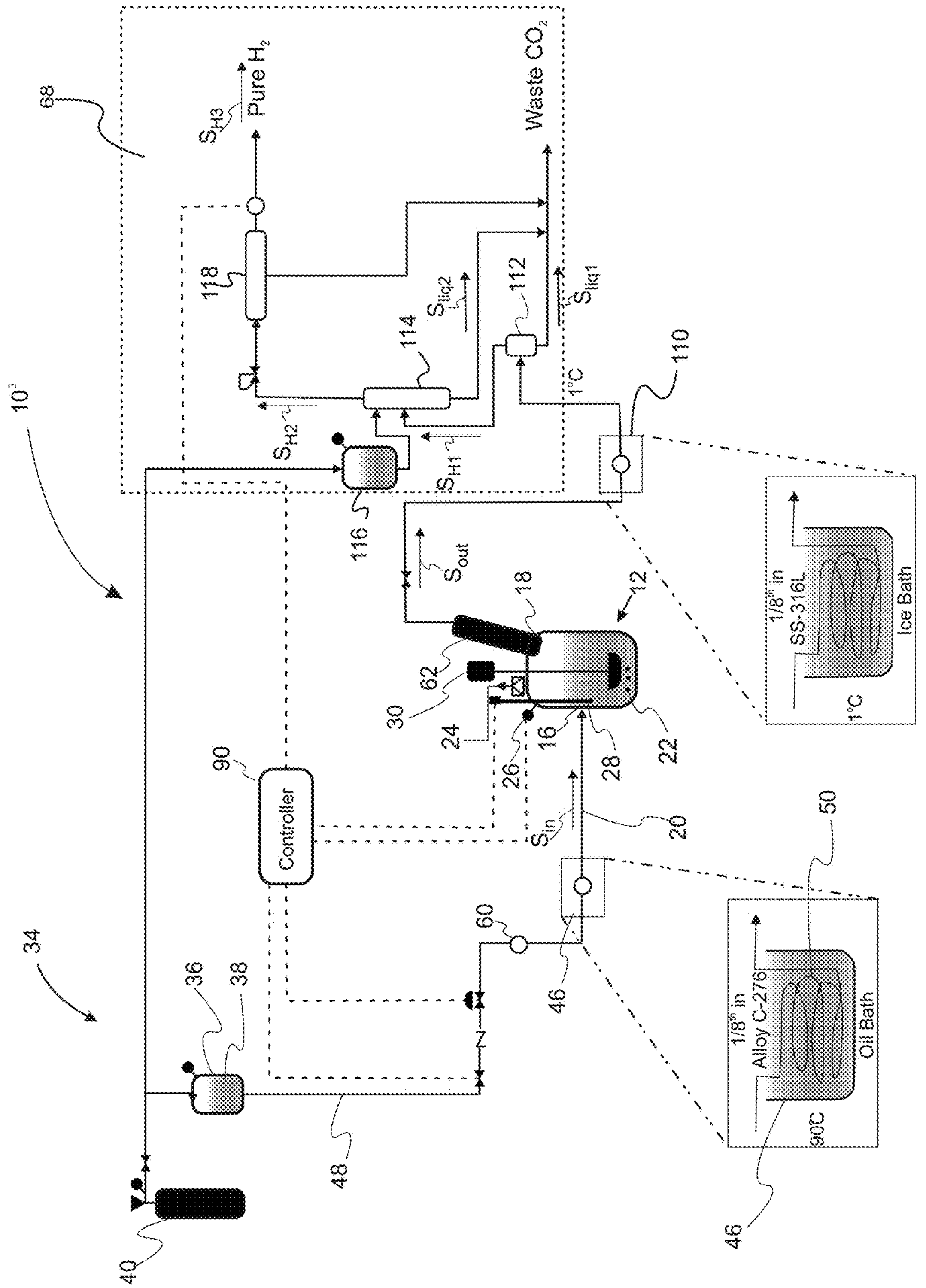
FIG. 1C. Schematic of a lab-scale flow reactor system for producing on-demand molecular hydrogen gas that includes an apparatus and method for separation of $CO_2$ and $H_2$ on the back end of the reactor.

FIGS. 1A, 1B, and 1C are schematics of flow reactor systems that provide on-demand $H_2$ evolution from liquid organic hydrogen carriers and/or blends thereof. Flow reactor systems 10$^1$, 10$^2$, and 10$^3$ each include a reactor 12 having a reaction vessel 14. The reaction vessel 14 includes an inlet 16 and an outlet 18. Stream $S_{in}$ of preheated liquid organic hydrogen carriers and/or blends thereof is introduced into the reaction vessel 14 through inlet 16 via conduit 20. A catalyst system 22 is also loaded into the reaction vessel 14. Advantageously, the liquid organic hydrogen carriers and/or blends thereof decompose to carbon dioxide and molecular hydrogen in reactor 12. Examples of the liquid organic hydrogen carriers include but are not limited to organic acids (e.g., $C_{1-5}$ carboxylic acids) and organic alcohols (e.g., $C_{1-5}$ alcohols). Particularly useful liquid organic hydrogen carriers are formic acid, methanol, and ethanol.

Advantageously, the flow reactor systems of 1A, 1B, and 1C allow the continuous production of pressurized $H_2$ in a process with reactants continuously flowing in and products flowing out during a predetermined time period (e.g., 1 to 6 months or more). the system is operated. Characteristically, the catalyst system 22 has a sufficient efficiency and lifetime (i.e., timer duration that the catalyst remains efficient) to allow this continuous operation. Therefore, long lifetimes allow the flow reactor systems to run for long periods of time, e.g., 1 to 6 months or more. Moreover, for at least some catalyst systems disclosed herein minute quantities of CO accelerate the catalyst efficiency rather than poison it.

Although the present design is not particularly limited by the volume of liquids that can be held in the reaction vessel 14, the typical volume capacity of the reaction vessel 14 for real-world applications is about 1 to 30 $m^3$ or more. Advantageously, the reaction vessel 14 is of sufficient size to provide 300 kg/hr or more of $H_2$. A lab-scale reaction vessel as depicted in FIG. 1C can be much smaller (e.g., 100 mL to 1 L volume capacity).

During operation, reactor 12 will typically operate at pressures reaction at pressures greater than about 50 psig (e.g., from about 50 psig up to about 10500 psig). In a refinement, reactor 12 is configured to operate at pressures from about a 500 psig to about 2500 psig. In another refinement, reactor 12 is configured to operate at pressures from about a 1500 psig to about 2250 psig. Therefore, reaction vessel 14 is composed of a metal that can withstand the pressures applied therein and is chemically inert to heated liquid organic hydrogen carriers and/or blends thereof, hydrogen gas, and any other chemical species contained therein. For this purpose, nickel-based alloys such as a HASTELLOY™ (e.g., HASTELLOY™ C-276) are found to be particularly useful. HASTELLOY™ 276 is composed of an austenitic nickel-molybdenum-chromium alloy with a small addition of tungsten.

In some refinements, reactor 12 includes a pressure relief safety device 24 (e.g., a rupture disc or pressure-relief valve) to ensure that the pressure in the reaction vessel 14 does not exceed a predefined pressure. In a refinement, a pressure gauge 26 is used to monitor the pressure within the reaction vessel 14, and a thermometer 28 is used to measure the temperature of the liquid contained within the reaction vessel 14. In a refinement, reactor 12 is operated at a temperature from about 80° C. to 120° C. Heaters and coolers can be deployed for this purpose. Stirrer 30 is used to mix the reactants.

Still referring to FIGS. 1A, 1B, and 1C, the preheated liquid organic hydrogen carriers is provided to the reaction vessel 14 by liquid organic hydrogen carriers supply subsystem 34. Supply subsystem 34 includes vessel 36, which holds the liquid organic hydrogen carriers 38 (i.e., a formic acid containment vessel). A gas can come from pressured gas source 40 to be used to push the liquid organic hydrogen carriers towards reactor 12. A particularly useful gas for pushing the liquid is a pressurized inert gas such as pressurized $N_2$. Conduit 42 (e.g, a metal tube) is used to flow the gas from pressurized gas source 40 to vessel 38. Such a gas can be provided from a pressured tank. In a refinement, the liquid organic hydrogen carrier is directed to a heater 46 via liquid organic hydrogen carrier feed conduit 48 in which the liquid organic hydrogen carrier is heated. Typically, the liquid organic hydrogen carriers is heated to a temperature from about 70° C. to about 110° C. by heater 66. FIGS. 1A and 1C depict an example of a heater in which a coil 50 in fluid communication with conduit 48 is submerged in an oil bath that is heated to a predefined temperature. The preheated liquid organic hydrogen carrier then proceeds to the reaction vessel 14 through conduit 20 which is also in fluid communication with conduit 48. In a refinement, conduits 42 and 48 are composed of a non-corroding metal alloy such as stainless steel (e.g., SS-316L) or a HASTELLOY™. In a refinement as depicted in FIG. 1B, the supply subsystem 34 of flow reactor systems $10^2$ is a dual vessel system that includes vessels 36 and 36'. This dual vessel system allows for the liquid organic hydrogen carriers to be continually supplied when one vessel is empty. Moreover, the control valve 39 and 39' can be set so that the gas from the pressurized gas source flow through an empty vessel to a vessel that is not empty.

In some variations, conduits 42 and 48 are connected with one or more flow valves or flow controls. For example, FIG. 1 depicts safety shut-off valve 54, check valve 56, and control valve 58 positioned along conduit 48. An optional flow meter 60 can measure the fluid flow through conduit 48.

Still referring to FIGS. 1A, 1B, and 1C, reactor 12 further includes a reflux condenser 62 attached to outlet 18. The reflux condenser is operated to allow gaseous species to pass therethrough while condensing liquids such as unreacted liquid organic hydrogen carrier. 52 Therefore, a gaseous reaction product stream $S_{out}$ is received into and flows through conduit 64. Typically, reflux condenser 64 is composed of a corrosion-resistant alloy. For this purpose, nickel-based alloys such as a HASTELLOY™ (e.g., HASTELLOY™ C-276) are found to be particularly useful.

In a variation, reactor 12 includes a purification system 68 in fluid communication with the outlet. Advantageously, the purification system 68 provides purified molecular hydrogen gas. Advantageously, the purification system provides purified molecular hydrogen for on-demand hydrogen applications.

In a refinement, as depicted in FIG. 1A, the purification system 68 of reactor system $10^1$ includes secondary condenser 68. Gaseous reaction products then proceed via conduit 64 to secondary condenser 68 which removes $CO_2$. Therefore, secondary condenser 68 is downstream of reflux condenser 50. Conduit 64 and secondary condenser 68 are typically composed of a non-corrosive metal alloy such as stainless steel or Hastelloy. Conduit 68 can include one or more flow valves and/or flow control devices such as backpressure regulator 76 and flow meter 78. Typically, the pressure of the gaseous mixture entering secondary condenser 68 is significantly reduced from the pressure of reactor 12 (e.g., on the order of 5 to 30 psig) through the action of backpressure regulator 76. Secondary condenser 68 is used to remove a significant amount of $CO_2$ from the gaseous product stream. In a refinement, secondary condenser 68 is operated to produce supercritical liquid carbon dioxide that can be removed and separated from the gaseous product stream.

With reference to FIG. 1A, the purification system 68 of reactor system $10^1$ also includes a carbon dioxide scrubber 80 downstream of secondary condenser 68 as part of the purification system. Carbon dioxide scrubber 80 is used to further purify the gaseous product stream to produce purified molecular hydrogen. Advantageously, carbon dioxide scrubber 80 removes carbon dioxide through the use of solid sorbents. Examples of suitable sorbents include, but are not limited to, the solid sorbents described in U.S. Pat. Nos. 7,795,175; 9,968,880; and 10,751,689; the entire disclosures of which are hereby incorporated by reference. In one variation, solid sorbents for adsorbing carbon dioxide from a gas mixture include a modified polyamine and a solid support. Characteristically, the modified polyamine is the reaction product of an amine and an epoxide. Advantageously, the sorbent is regenerative and can be used through multiple cycles of adsorption-desorption. In a refinement, the modified polyamine is a reaction product of an excess of an amine selected from the group consisting of tetraethylenepentamine, pentaethylenehexamine, hexaethyleneheptamine, triethylenetetramine, diethylenetriamine, polyethylenimine and a mixture thereof, and a monoepoxide selected from the group consisting of ethylene oxide, propylene oxide, 1,2-epoxybutane, 1,2-epoxypentane and 1,2-epoxyhexane to provide a material with amine functionalities. In a further refinement, the solid support is (a) a nano-structured support of silica, silica-alumina, alumina, titanium oxide, calcium silicate, carbon nanotubes, carbon, or a mixture thereof and having a primary particle size of less than about 100 nm; or (b) a natural or synthetic clay or a mixture thereof. The gas stream emerging from the carbon dioxide scrubber is essentially purified molecular hydrogen gas that is suitable for on-demand hydrogen application.

In a refinement, as depicted in FIG. 1B, the purification system 68 of reactor system $10^2$ includes $CO_2$ condenser 92. Gaseous reaction product stream $S_{out}$ from the reaction vessel 14 then proceeds via conduit 64 to $CO_2$ condenser 92. Typically, $CO_2$ condenser 92 cools the gaseous reaction product stream down to between −78° C. and 15° C. to produce the first liquid $CO_2$ stream $S_{lig1}$ and the first $H_2$-containing gaseous stream $S_{H1}$. First liquid $CO_2$ stream $S_{lig1}$ flows to flash separator 94 which depressurizes the liquid $CO_2$ thereby allowing dissolved $H_2$ to be recycled back to $CO_2$ condenser. First $H_2$-containing gaseous stream $S_{H1}$ flows through a conduit to liquid-gas extraction vessel 98 allowing high-pressure water to selectively extract $CO_2$ dissolved in the gaseous reaction product stream. Second $H_2$-containing gaseous stream $S_{H2}$ and second liquid $CO_2$ stream $S_{lig2}$ flow out of liquid-gas extraction vessel 98. In a refinement, second $H_2$-containing gaseous stream $S_{H2}$ then flows to optional $CO_2$ scrubber 100 which absorbs any trace $CO_2$ and/or CO in the second $H_2$-containing gaseous stream $S_{H2}$ such that output purified stream $S_{H3}$ is outputted. Flash separator 102 depressurizes the liquid $CO_2$ in the second liquid $CO_2$ stream $S_{lig2}$ thereby allowing dissolved $H_2$ to be recycled back to liquid-gas extraction vessel 98 92 with the assistance of pump 96.

In another refinement, as depicted in FIG. 1C, the purification system 68 of reactor system 10[3] includes cooler 110 which cools gaseous reaction product stream $S_{out}$. The cooled gaseous reaction product stream $S_{out}$ then proceeds to flash separator 112 which outputs the first liquid $CO_2$ stream $S_{lig1}$ as waste and the first $H_2$-containing gaseous stream $S_{H1}$. Extraction vessel 114 receives first $H_2$-containing gaseous stream $S_{H1}$. Water from water containment vessel 116 is also introduced into extraction vessel 114. Water containment vessel 116 outputs second liquid $CO_2$ stream $S_{lig2}$ as waste and second $H_2$-containing gaseous stream $S_{H2}$. In a refinement, hydrogen gas stream $S_{H2}$ then flows to optional $CO_2$ scrubber 112 which absorbs any trace $CO_2$ and/or CO in the crude $H_2$ stream. Therefore, optional $CO_2$ scrubber 112 outputs the third first liquid $CO_2$ stream $S_{lig3}$ as waste and purified third $H_2$-containing gaseous stream $S_{H3}$.

Referring to FIGS. 1A, 1B, and 1C, reactor systems 10[1], 10[2], and 10[3] also include controller system 90 which is used to measure and/or control certain reactor system parameters such as temperature, pressure, flow rates, and the like. Typically controller system 90 will be a microcontroller. In a refinement, controller system 80 includes a computer processer. FIGS. 1A, 1B, and 1C depict controller 90 in electrical communication with a safety shut-off valve 54, check valve 56, and control valve 58 positioned along conduit 48. Controller 90 is also in electrical communication with pressure transducer 26, thermometer 28, and flow meter 60.

In a variation, the reactor systems of FIGS. 1A, 1B, and 1C are used to convert a blended fuel to hydrogen gas. In one refinement, the blended fuel includes formic acid and another hydrogen-rich liquid. Examples of such hydrogen-rich liquids include, but are not limited to, water, methanol, cyclohexylmethanol, and combinations thereof. In a further refinement, such hydrogen-rich liquids function as a molecular hydrogen carrier. An example of a blended fuel includes aqueous methanol and formic acid. In a refinement, the blended fuel includes 1 to 100 percent methanol and 0 to 99 percent formic acid.

Advantageously, the flow reactor systems of FIGS. 1A, 1B, and 1C produce molecular hydrogen gas by the catalytic decomposition of liquid organic hydrogen carrier into carbon dioxide and molecular hydrogen in reactor 12. The method performed in reactor 12 includes a step of contacting a catalyst system with liquid organic hydrogen carrier optionally in the presence of a base. In a refinement, the reaction is carried out at pressures greater than about 50 psig. In a further refinement, the reaction is carried out at pressures from about 50 psig to about 10500 psig. In a further refinement, the reaction is carried out at pressures from about 50 psig to about 2500 psig. In a further refinement, the reaction is carried out at pressures from about 1500 psig to about 2250 psig. In some refinements, the reaction is carried out at pressures greater than or equal to, in increasing order of preference, 20 psig, 30 psig, 50 psig, 100 psig, 200 psig, 300 psig, 400 psig, or 500 psig. Moreover, the reaction can be carried out at pressures less than or equal to, in increasing order of preference, 12000 psig, 10500 psig, 10000 psig, 9000 psig, 8000 psig, 7000 psig, 6000 psig, 5000 psig, 4000 psig, 3000 psig, 2500 psig, or 2250 psig. In a further refinement, typical reaction temperatures are from about 80° C. to 120° C. Advantageously, this step can be performed substantially free of solvents other than liquid organic hydrogen carrier. Molecular hydrogen is then collected from the reaction of liquid organic hydrogen carrier through the purification component set forth above. Examples of catalysts include, but are not limited to, $[(tBu_2PCH_2(2\text{-}py))RuCl(cym)]OTf$, Shvo's catalyst, $[Ir(COD)(Cl)_2]_2$, $Ir(CN)(CO)_2$, Ir(CN)COD, Crabtree's Cat, $[IrCp^*Cl_2]_2$, and $[Ru(p\text{-}cymene)Cl_2]_2$ where Cp means cyclopentadienyl, COD means 1,5-cyclooctadiene, and "OTf" means trifluoromethanesulfonate.

In a variation, the catalyst system includes a transition metal-containing organometallic complex. In a refinement, the catalyst system includes an iridium-containing organometallic complex. The transition metal-containing organometallic complex can be described by the following formula $$ML_nX_m \qquad (1)$$

wherein:

n is 1 to 8;

m is 0, 1, or 2;

M is a transition metal;

X is a negatively charge counter ion which maintains charge neutrality. Examples for X includes halide and OTf. L is a ligand. A variety of different ligands may be used for L. For example, L can be a two electron ligand, a multidentate ligand (e.g., a bidentate ligand), charged ligand (e.g., −1 charged), a neutral ligand, and combinations thereof. Although n gives the number of ligands, the ligands need not be the same for values of n greater than 2. Specific examples for L include, but are not limited to: H, CO, halide, $PH_4$, $PPh_3$,

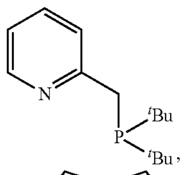,
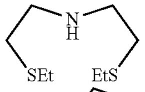,
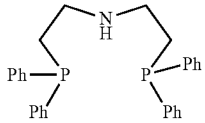,
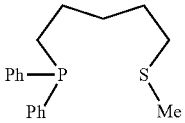,
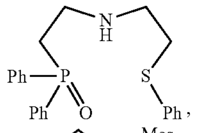,
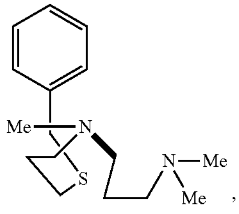,
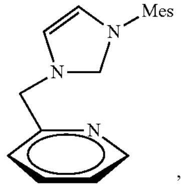,
,
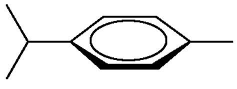,
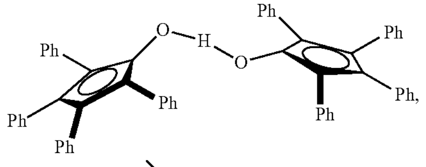
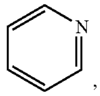,
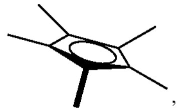,
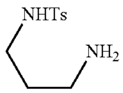, -continued

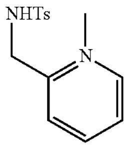
,
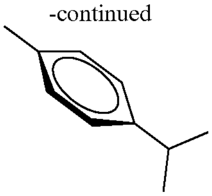
,
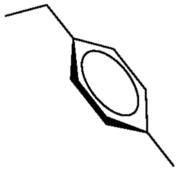
, and combinations thereof.

Additional useful catalysts are disclosed in U.S. Pat. Nos. 10,556,921 and 10,179,798; the entire disclosures of which are hereby incorporated by reference herein. In one variation, the catalyst system includes organometallic complexes having general formula A:

(A)

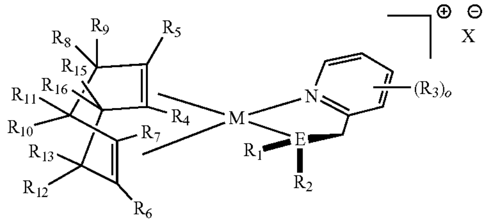

wherein:

M is a transition metal;

E is P, N, or C (as in imidazolium carbene);

$R_1$, $R_2$ are independently $C_{1-6}$ alkyl groups;

is 1, 2, 3, or 4;

$R_3$ are independently hydrogen, $C_{1-6}$ alkyl groups, $OR_{14}$, $NO_2$, halogen;

$R_4$, $R_5$, $R_6$, $R_7$, $R_8$, $R_9$, $R_{10}$, $R_{11}$, $R_{12}$, $R_{13}$, $R_{15}$, $R_{16}$ are independently hydrogen or $C_{1-6}$ alkyl groups;

$R_{14}$ is a $C_{1-6}$ alkyl group; and $X^-$ is a negatively charge counter ion.

In a refinement, M is a metal selected from the group consisting of beryllium, magnesium, aluminum, scandium, titanium, vanadium, chromium, manganese, iron, cobalt, copper, zinc, gallium, germanium, yttrium, zirconium, niobium, molybdenum, technetium, ruthenium, rhodium, silver, cadmium, indium, tin, antimony, lanthanum, cerium, praseodymium, neodymium, promethium, samarium, europium, gadolinium, terbium, dysprosium, holmium, erbium, thallium, ytterbium, lutetium, hafnium, tantalum, tungsten, rhenium, osmium, iridium, gold, thallium, lead, bismuth, polonium, thorium, protactinium, uranium, neptunium, and plutonium.

In another variation, the catalyst system including an organometallic complex having formula B is provided:

(B)

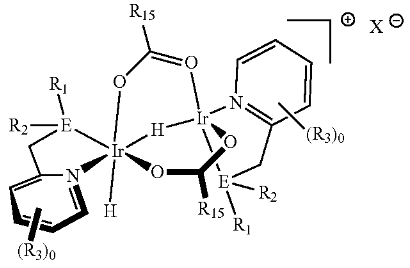

wherein:

M is a transition metal;

E is P, N, or C (as in imidazolium carbene);

$R_1$, $R_2$ are each independently $C_{1-6}$ alkyl groups;

$R_3$ is independently hydrogen, $C_{1-6}$ alkyl groups, $OR_{14}$, $NO_2$, halogen;

is 1, 2, 3, or 4;

$R_{14}$ is hydrogen or a $C_{1-6}$ alkyl group;

$R_{15}$ is hydrogen or a $C_{1-6}$ alkyl group; and $X^-$ is a negatively charge counter ion. Complexes having general formula B are prepared by dimerizing complexes having general formula A.

In another variation, the catalyst system includes an organometallic complex having a formula selected from the group consisting of:

1

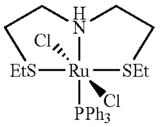
,

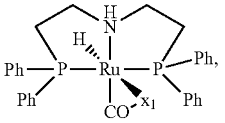

2 (X = Cl)
3 (X = $BH_4$)

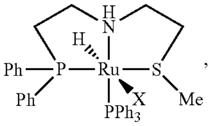
, 4 (X = Cl)
5 (X = H)

6

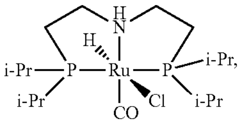

7

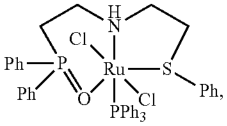

8

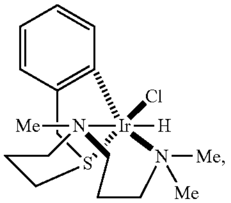

-continued
9-CO
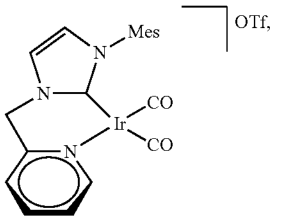
10
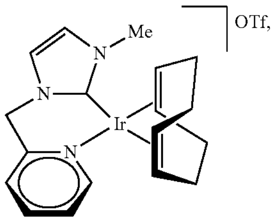
11
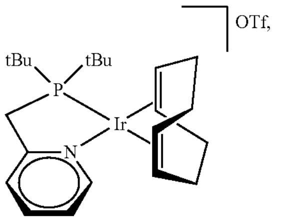
12
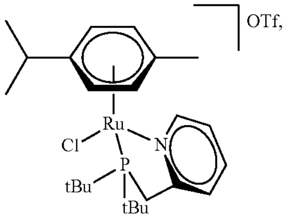
13
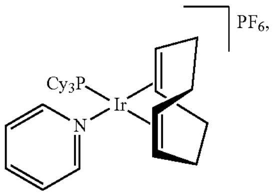
14
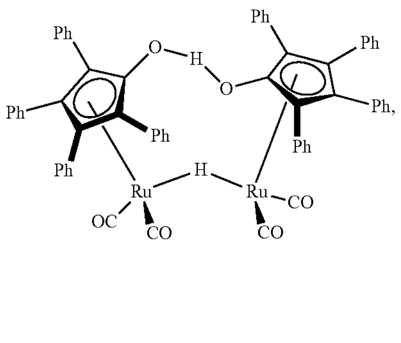
-continued
15
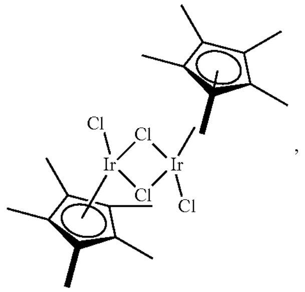
16
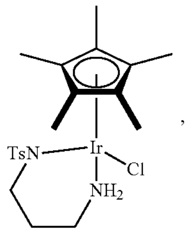
17
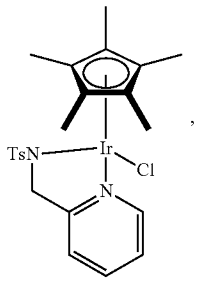
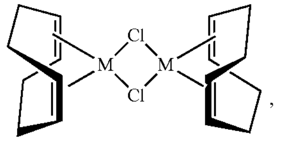
18 (M = Rh)
19 (M = Ir)
20
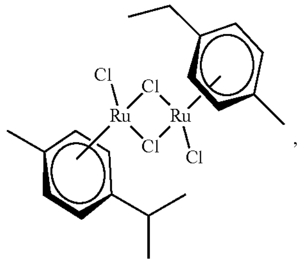
21
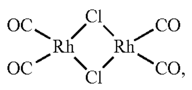
and combinations thereof.
In another variation, the catalyst system includes an organometallic complex having a formula selected from the group consisting of:

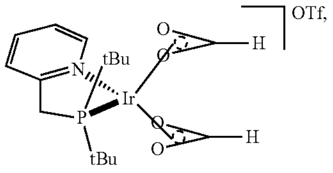

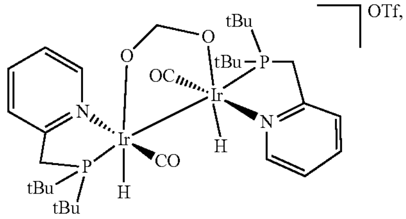

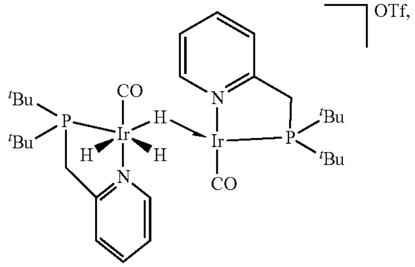

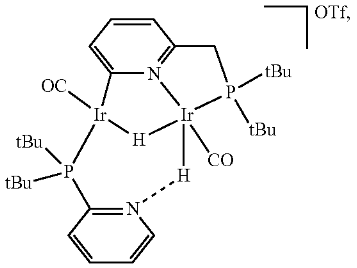

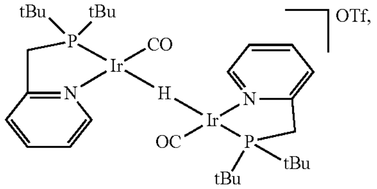

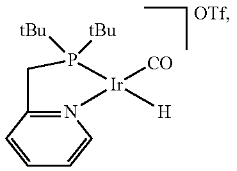

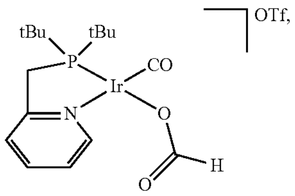

and combinations thereof.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A flow reactor system for providing on-demand $H_2$ evolution at pressure from liquid organic hydrogen carriers and/or blends thereof comprising:

a reactor that includes a reaction vessel having an inlet and outlet, the inlet configured to introduce reactants into the reaction vessel and the outlet configured to release reaction products as a gaseous reaction product stream, the reaction vessel configured to hold therein a catalyst system capable of catalyzing evolution of molecular hydrogen from a liquid organic hydrogen carrier or a blend thereof, the reaction vessel configured to operate at pressures greater than or equal to 50 psig;

a source of preheated fuel in fluid communication with the reactor; and a purification system in fluid communication with the outlet, the purification system providing purified molecular hydrogen gas, wherein the catalyst system includes a transition metal-containing organometallic complex.

2. The flow reactor system of claim 1, wherein the reaction vessel configured to operate at pressures from 50 to 10500 psig.

3. The flow reactor system of claim 1 further comprising the catalyst system loaded into the reaction vessel.

4. The flow reactor system of claim 1, wherein the reactor includes a reflux condenser attached to the outlet, the reflux condenser operated to allow the gaseous reaction product stream to pass therethrough while condensing liquids.

5. The flow reactor system of claim 4, wherein the gaseous reaction product stream includes molecular hydrogen and carbon dioxide.

6. The flow reactor system of claim 4, wherein the purification system provides purified molecular hydrogen for on-demand hydrogen applications.

7. The flow reactor system of claim 6, wherein the purification system includes a secondary condenser downstream of the reflux condenser that removes carbon dioxide as a liquid from the gaseous reaction product stream.

8. The flow reactor system of claim 7, wherein the secondary condenser is configured to produce supercritical liquid carbon dioxide.

9. The flow reactor system of claim 7 further comprising a carbon dioxide scrubber that further removes carbon dioxide from the gaseous reaction product stream to produce the purified molecular hydrogen gas.

10. The flow reactor system of claim 9 wherein the carbon dioxide scrubber includes a solid sorbent.

11. The flow reactor system of claim 9 further comprising a controller system for measuring and/or controlling reactor system parameters such as temperature, pressure, and flow rates.

12. The flow reactor system of claim 1 wherein the liquid organic hydrogen carrier includes formic acid and a hydrogen-rich liquid other than formic acid.

13. The flow reactor system of claim 12 wherein the hydrogen-rich liquid other than formic acid is selected from the group consisting of water, methanol, cyclohexylmethanol, and combinations thereof.

14. The flow reactor system of claim 12 wherein the liquid organic hydrogen carrier includes 1 to 100 weight percent methanol and 0 to 99 weight percent formic acid.

15. The flow reactor system of claim 1 wherein the catalyst system includes [$(tBu_2PCH_2(2\text{-}py))RuCl(cym)$]

OTf, Shvo's Catalyst, $[Ir(COD)(Cl)_2]_2$, $Ir(CN)(CO)_2$, Ir(CN)COD, Crabtree's Cat, $[IrCp^*Cl_2]_2$, and $[Ru(p\text{-cymene})Cl_2]_2$ where Cp means cyclopentadienyl, COD means 1,5-cyclooctadiene, and "OTf" Means trifluoromethanesulfonate.

16. The flow reactor system of claim 1, wherein the catalyst system includes an iridium-containing organometallic complex.

17. The flow reactor system of claim 1, wherein the catalyst system includes a transition metal-containing organometallic complex having the following formula:

$ML_nX_m$ wherein:

n is 1 to 8;

m is 0, 1, or 2;

M is a transition metal;

X is a negatively charge charged counter ion; and

L is a ligand.

18. The flow reactor system of claim 17 wherein L is selected from the group consisting of: H, CO, halide, $PH_4$, $PPh_3$,

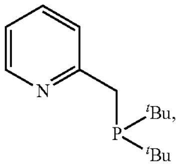
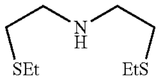
,
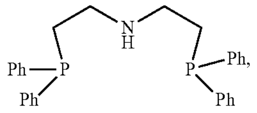
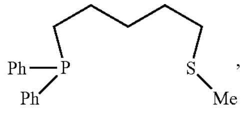
,
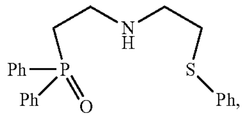
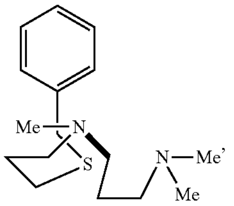
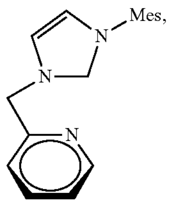
,
,
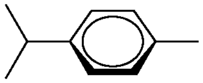
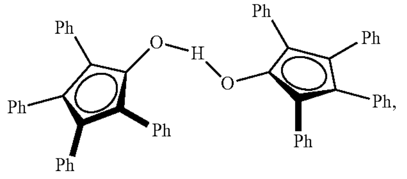
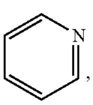
,
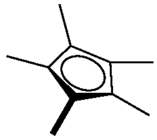
,
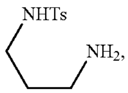
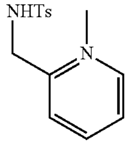
, -continued

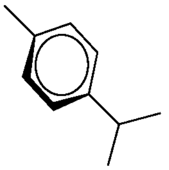
, and
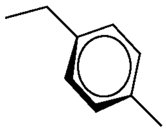
.

19. The flow reactor system of claim 1 wherein the catalyst system includes organometallic complexes having general formula A:

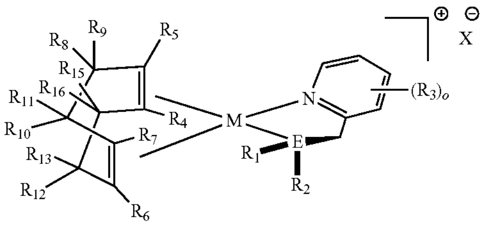
(A)

wherein:
- M is a transition metal;
- E is P, N, or C (as in imidazolium carbene);
- $R_1$, $R_2$ are independently $C_{1-6}$ alkyl groups;
- is 1, 2, 3, or 4;
- $R_3$ are independently hydrogen, $C_{1-6}$ alkyl groups, $OR_{14}$, $NO_2$, halogen;
- $R_4$, $R_5$, $R_6$, $R_7$, $R_8$, $R_9$, $R_{10}$, $R_{11}$, $R_{12}$, $R_{13}$, $R_{15}$, $R_{16}$ are independently hydrogen or $C_{1-6}$ alkyl groups;
- $R_{14}$ is a $C_{1-6}$ alkyl group; and
- $X^-$ is a negatively charged counter ion.

20. The flow reactor system of claim 1 wherein the catalyst system includes organometallic complexes having general formula A:

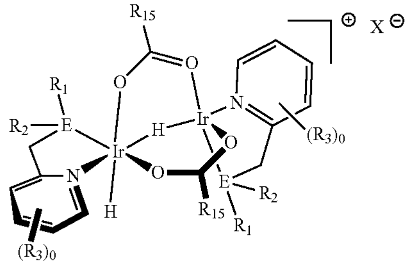
(B)

wherein:
- M is a transition metal;
- E is P, N, or C (as in imidazolium carbene);
- $R_1$, $R_2$ are each independently $C_{1-6}$ alkyl groups;
- $R_3$ is independently hydrogen, $C_{1-6}$ alkyl groups, $OR_{14}$, $NO_2$, halogen;
- o is 1, 2, 3, or 4;
- $R_{14}$ is hydrogen or a $C_{1-6}$ alkyl group;
- $R_{15}$ is hydrogen or a $C_{1-6}$ alkyl group; and
- $X^-$ is a negatively charged counter ion, Complexes having general formula B are prepared by dimerizing complexes having the general formula A.

21. The flow reactor system of claim 1 wherein the catalyst system includes an organometallic complex having a formula selected from the group consisting of:

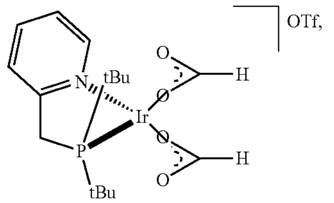

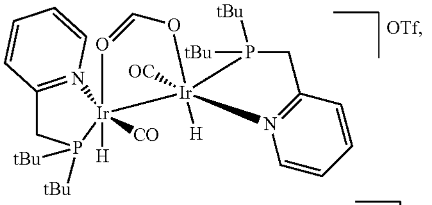

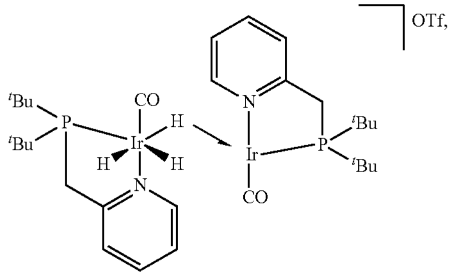

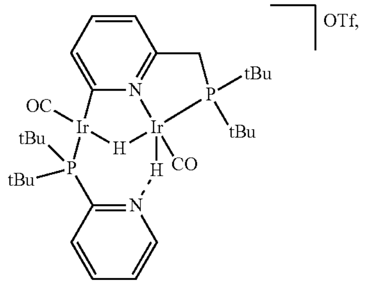

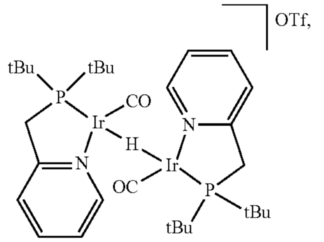

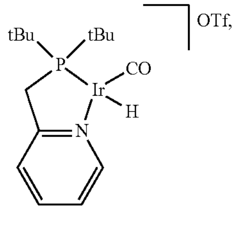

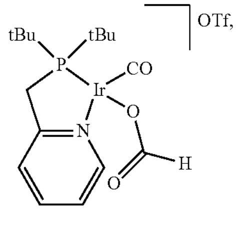

and combinations thereof.

22. The flow reactor system of claim 1 wherein the purification system includes a $CO_2$ condenser that receives the gaseous reaction product stream, the $CO_2$ condenser cooling the gaseous reaction product stream and outputting a first liquid $CO_2$ stream and a first $H_2$-containing gaseous stream, the first liquid $CO_2$ stream flowing to a flash separator that depressurizes liquid $CO_2$ thereby allowing dissolved $H_2$ to be recycled back to the $CO_2$ condenser.

23. The flow reactor system of claim 22 wherein the first $H_2$-containing gaseous stream flows to a liquid-gas extraction vessel allowing high-pressure water to selectively extract $CO_2$ dissolved in the gaseous reaction product stream, a second $H_2$-containing gaseous stream and a second liquid $CO_2$ stream flows out of liquid-gas extraction vessel.

24. The flow reactor system of claim 23 wherein the second $H_2$-containing gaseous stream flows to optional $CO_2$ scrubber which absorbs any trace $CO_2$ and/or CO in the second $H_2$-containing gaseous stream such a purified stream $S_{H3}$ is outputted and wherein the flash separator depressurizes the liquid $CO_2$ in the second liquid $CO_2$ stream thereby allowing dissolved $H_2$ to be recycled back to liquid-gas extraction vessel.

25. A method for producing on-demand $H_2$ from organic hydrogen carriers and/or blends thereof, the method comprising:

providing a reaction vessel having a catalyst system disposed therein;

continuously flowing a preheated liquid organic hydrogen carrier or a blend thereof into the reaction vessel over a predetermined period of time at pressures greater than or equal to 50 psig; and purifying an output stream from the reaction vessel to obtain purified molecular hydrogen gas.

26. A flow reactor system for providing on-demand $H_2$ evolution at pressure from liquid organic hydrogen carriers and/or blends thereof comprising:

a reactor that includes a reaction vessel having an inlet and outlet, the inlet configured to introduce reactants into the reaction vessel and the outlet configured to release reaction products as a gaseous reaction product stream, the reaction vessel configured to hold therein a catalyst system capable of catalyzing evolution of molecular hydrogen from a liquid organic hydrogen carrier or a blend thereof, the reaction vessel configured to operate at pressures greater than or equal to 50 psig;

a source of preheated fuel in fluid communication with the reactor;

a purification system in fluid communication with the outlet, the purification system providing purified molecular hydrogen gas; and a reflux condenser attached to the outlet, the reflux condenser operated to allow the gaseous reaction product stream to pass therethrough while condensing liquids.

27. A flow reactor system for providing on-demand $H_2$ evolution at pressure from liquid organic hydrogen carriers and/or blends thereof comprising:

a reactor that includes a reaction vessel having an inlet and outlet, the inlet configured to introduce reactants into the reaction vessel and the outlet configured to release reaction products as a gaseous reaction product stream, the reaction vessel configured to hold therein a catalyst system capable of catalyzing evolution of molecular hydrogen from a liquid organic hydrogen carrier or a blend thereof, the reaction vessel configured to operate at pressures greater than or equal to 50 psig;

a source of preheated fuel in fluid communication with the reactor; and a purification system in fluid communication with the outlet, the purification system providing purified molecular hydrogen gas, wherein the liquid organic hydrogen carrier includes formic acid and a hydrogen-rich liquid other than formic acid.

28. A flow reactor system for providing on-demand $H_2$ evolution at pressure from liquid organic hydrogen carriers and/or blends thereof comprising:

a reactor that includes a reaction vessel having an inlet and outlet, the inlet configured to introduce reactants into the reaction vessel and the outlet configured to release reaction products as a gaseous reaction product stream, the reaction vessel configured to hold therein a catalyst system capable of catalyzing evolution of molecular hydrogen from a liquid organic hydrogen carrier or a blend thereof, the reaction vessel configured to operate at pressures greater than or equal to 50 psig;

a source of preheated fuel in fluid communication with the reactor; and a purification system in fluid communication with the outlet, the purification system providing purified molecular hydrogen gas, wherein the purification system includes a $CO_2$ condenser that receives the gaseous reaction product stream, the $CO_2$ condenser cooling the gaseous reaction product stream and outputting a first liquid $CO_2$ stream and a first $H_2$-containing gaseous stream, the first liquid $CO_2$ stream flowing to a flash separator that depressurizes liquid $CO_2$ thereby allowing dissolved $H_2$ to be recycled back to the $CO_2$ condenser.

* * * * *